(No Model.)
L. D. RIEGEL.
PNEUMATIC BUFFER.
No. 433,657. Patented Aug. 5, 1890.
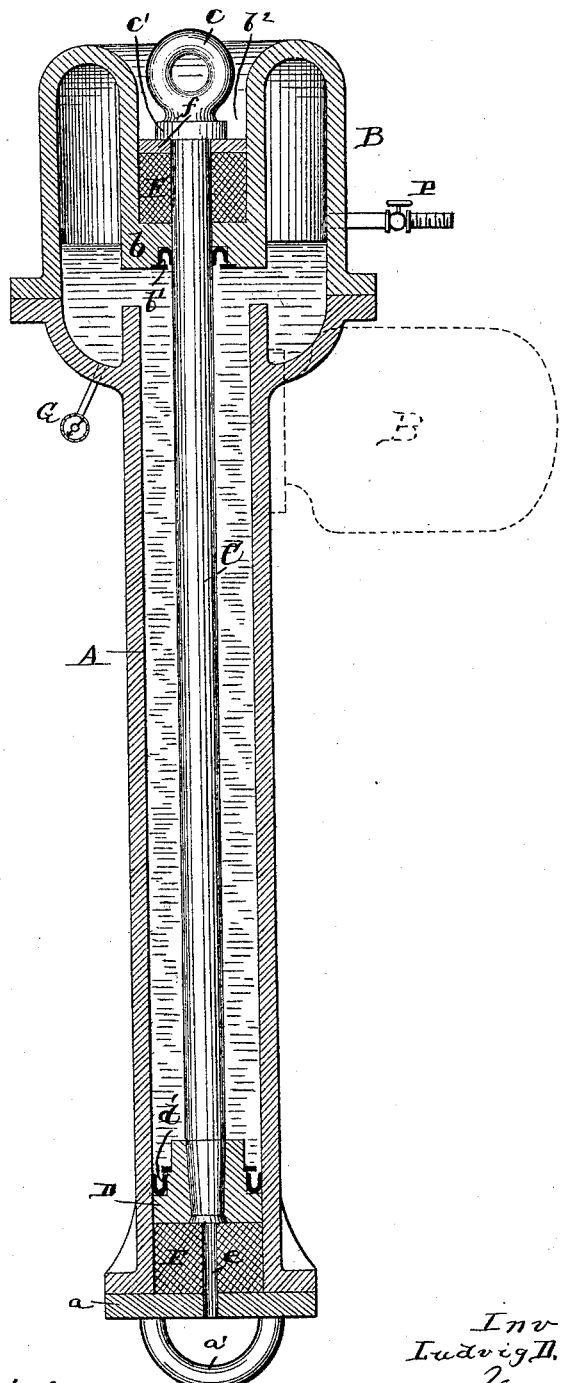
Witnesses
Henry G. Dieterich
H. V. Weaver.
Inventor
Ludvig D. Riegel
Henry Oth
Attorney

UNITED STATES PATENT OFFICE.

LUDVIG DIDRIK RIEGEL, OF CHRISTIANIA, NORWAY.

PNEUMATIC BUFFER.

SPECIFICATION forming part of Letters Patent No. 433,657, dated August 5, 1890.

Application filed May 12, 1890. Serial No. 351,576. (No model.) Patented in Norway October 9, 1889, No. 1,563.

*To all whom it may concern:*

Be it known that I, LUDVIG DIDRIK RIEGEL, a subject of the King of Norway, residing at Christiania, in the Kingdom of Norway, have invented certain new and useful Improvements in Pneumatic Buffers, (for which I have obtained Letters Patent in Norway, under date of October 9, 1889, and numbered 1,563;) and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The invention has for its object means for counteracting or taking up or accumulating the force or power resulting from sudden stress or strain upon a chain or rope—as, for instance, upon an anchor-chain, a tow-rope, or a whaling-hawser and the like—and thereby prevent their breaking or snapping when exposed to such sudden stress or strain in heavy seas.

Heretofore rubber buffers have, I believe, been used exclusively for the purposes referred to; but, as is well known, but little assistance is afforded by such buffers, for the reason that their resilient force is a comparatively limited one.

According to this invention I provide a pneumatic buffer, the resiliency of which may be varied at will, such buffer being provided with means for attaching it to a fixed support, and for attaching thereto the chain or rope or hawser, as the case may be.

The apparatus consists, essentially, of a piston-cylinder adapted to contain a liquid and provided with an air-chamber having a suitable branch for connection with a pump and a pressure-gage, so that the air-pressure therein may be varied at pleasure or according to the strain the chain may be subjected to. Within the cylinder is arranged a piston to which the chain, rope, or cable is attached, the cylinder itself being attached to a fixed support on board ship.

In the accompanying drawing I have shown a pneumatic buffer more especially adapted for use with a whaling-hawser by a longitudinal axial section.

A indicates the cylinder, that is closed at its inner end by a cap-plate $a$, provided with a loop or eye $a'$ for securing the cylinder on board ship. At its outer end the cylinder A is provided with an air-chamber B, in which is formed a suitable bearing $b$ for the piston-rod C, that carries the piston D, leather cup-washers $d'$ and $b'$ being provided for piston D and bearing $b$, respectively, to form tight joints, though any other suitable means may be provided for this purpose. At the inner end of the cylinder is arranged a rubber buffer E, and a like buffer F is arranged in the tubular recess $b^2$ of the air-chamber, at the end of which the bearing $b$ for the piston-rod C is formed, these buffers serving to take up the shock of piston-rod and piston when relieved of strain or stress, and forced back into their normal position by the pressure on the piston. At its outer end the piston-rod C has an eye $c$, to which the hawser is tied, and an annular flange-bearing $c'$, that abuts against a washer or bearing-plate $f$, secured on top of the rubber buffer-block F. A pipe P, communicating with the air-chamber B and provided with a cut-off valve or stop-cock, serves to connect the chamber with an air-pump, for the purpose of forcing air into said chamber and more or less compressing the same therein.

As shown, the cylinder A opens directly into the air-chamber, its walls being extended into the same, so as to form an annular cup-like recess for the liquid. Although this construction is preferred, it is not absolutely necessary. The air-chamber is provided with a pressure-gage G.

In whalers the buffer-cylinder would be arranged along the mast below deck with the air-chamber projecting above deck; but for anchor-chains, tow-ropes, and the like the buffer-cylinder would lie in a horizontal plane, and in such case the air-chamber B is preferably arranged radially of the cylinder, as shown in dotted lines.

The length of the cylinder and piston-rod may be varied according to the uses made of the apparatus. For use with a whaling-hawser the cylinder may be of such length as to give the piston a stroke of three or more feet, a buffer of great elastic or resilient power being thus obtained.

It will be obvious that by reversing the described arrangement the buffer may be used for resisting sudden shocks instead of sudden strains, the air-chamber being arranged in rear instead of in front of the piston D.

As shown in the drawings, an air-vent $e$ is formed through the cap-plate $a$ and the rubber buffer E for obvious purposes.

Having described my invention, what I claim, and desire to secure by Letters Patent, is—

1. A pneumatic buffer comprising a hydralic cylinder, an air-chamber in perpetual communication therewith, and a piston fitted fluid-tight in said cylinder in rear of the air-chamber and the volume of water in the cylinder, whereby the water is caused to compress the air in the air-chamber when the piston is moved in the direction of said chamber, and whereby said piston is returned to its normal position by the expansive power of the air when said piston is relieved of the strain or stress.

2. A pneumatic buffer comprising a cylinder adapted to contain a liquid, an air-chamber in communication with the cylinder, and a piston and piston-rod upon which the strain or shock is exerted, said piston being arranged to force the column of liquid into the air-chamber when influenced by a pull or strain or shock thereon, and rubber buffers arranged to take up the shocks of the piston and its rod when released from pull or shock and forced back into their normal position by the pressure within the cylinder, as set forth.

3. The combination of the cylinder A, provided with the eye or loop $a'$ and the air-chamber B, provided with the valved pipe P and pressure-gage G, and with a bearing $b$, of the piston-rod C, provided with the eye $c$ and the rubber buffers E and F, substantially as and for the purposes specified.

4. The combination of the cylinder A, provided with the eye or loop $a'$ and the air-chamber B, provided with the valved pipe P and pressure-gage G, and with a bearing $b$, of the piston-rod C, provided with the eye $c$ and with a bearing-flange $c'$, the rubber buffers E and F, and the washer or bearing-plate $f$ on the last-named buffer, substantially as and for the purposes specified.

In witness whereof I have hereunto set my hand in presence of two witnesses.

LUDVIG DIDRIK RIEGEL.

Witnesses:
ALFRED J. BRYN,
H. BONNOVIER.